(12) United States Patent
Ishimine (10) Patent No.: US 9,041,240 B2
(45) Date of Patent: May 26, 2015

(54) WIND TURBINE APPARATUS

(76) Inventor: Tadashi Ishimine, Naha (JP)

( * ) Notice: Subject to any disclaimer, the term of this patent is extended or adjusted under 35 U.S.C. 154(b) by 0 days.

(21) Appl. No.: 14/114,931

(22) PCT Filed: May 2, 2012

(86) PCT No.: PCT/JP2012/061608
§ 371 (c)(1),
(2), (4) Date: Oct. 31, 2013

(87) PCT Pub. No.: WO2012/150718
PCT Pub. Date: Nov. 8, 2012

(65) Prior Publication Data
US 2014/0077505 A1    Mar. 20, 2014

(30) Foreign Application Priority Data

May 2, 2011 (JP) ................. 2011-115203
Aug. 23, 2011 (JP) ................. 2011-197637
May 2, 2012 (JP) ................. 2012-105265

(51) Int. Cl.
| | |
|---|---|
| *F03D 9/00* | (2006.01) |
| *H02P 9/04* | (2006.01) |
| *F03D 3/00* | (2006.01) |
| *F03D 11/04* | (2006.01) |
| *F03D 1/02* | (2006.01) |

(52) U.S. Cl.
CPC ............... *F03D 3/005* (2013.01); *F03D 11/04* (2013.01); *F03D 1/02* (2013.01); *F05B 2240/915* (2013.01); *Y02E 10/721* (2013.01); *Y02E 10/728* (2013.01); *F03D 9/002* (2013.01); *F05B 2260/5032* (2013.01)

(58) Field of Classification Search
CPC .................................................. F05B 2240/61
USPC ........... 290/44, 55; 415/2.1, 4.1, 4.2, 4.4, 4.5, 415/4.3, 905, 907; 416/7, 132 B
See application file for complete search history.

(56) References Cited

U.S. PATENT DOCUMENTS 4,333,018 A * 6/1982 Bottrell ........................ 290/55
4,423,333 A   12/1983 Rossman (Continued)

FOREIGN PATENT DOCUMENTS

EP           095807 A2     7/1983
EP      2372151 A1 * 10/2011

(Continued)

OTHER PUBLICATIONS

Microfilm of the specification and drawings annexed to the request of Japanese Utility Model Application No. 092173/1982 (Laid open No. 193057/1983) (Mitsubishi Electric Corp.), Dec. 22, 1983, p. 3 line 9 to p. 4, line 13; fig. 2.

(Continued)

*Primary Examiner* — Tulsidas C Patel
*Assistant Examiner* — Charles Reid, Jr.
(74) *Attorney, Agent, or Firm* — Pearne & Gordon LLP (57) ABSTRACT

A wind turbine apparatus includes a wind turbine, a support column supporting the wind turbine, and a turning base as a base for the support column, the turning base including a turning gear and a turning base shaft. By turning the turning gear 360 degrees or more, only the wind turbine, or the support column and the wind turbine can turn 360 degrees or more about a rotating axis of the turning gear.

16 Claims, 2 Drawing Sheets

(56) References Cited

U.S. PATENT DOCUMENTS

| | | | |
|---|---|---|---|
| 6,540,570 B1 * | 4/2003 | Eakin | 440/37 |
| 6,984,899 B1 * | 1/2006 | Rice | 290/44 |
| 8,178,991 B2 * | 5/2012 | Smith | 290/55 |
| 8,698,331 B2 * | 4/2014 | Carter | 290/42 |
| 2003/0159874 A1 * | 8/2003 | Ha | 180/233 |
| 2005/0200135 A1 * | 9/2005 | Shibata et al. | 290/55 |
| 2005/0211826 A1 * | 9/2005 | Pai | 244/17.13 |
| 2007/0012266 A1 * | 1/2007 | Westerlund | 123/41 R |
| 2008/0309090 A1 * | 12/2008 | Stern et al. | 290/55 |
| 2009/0105645 A1 * | 4/2009 | Kidd et al. | 604/108 |
| 2010/0090468 A1 * | 4/2010 | Hong | 290/55 |
| 2010/0140390 A1 * | 6/2010 | Goodall | 244/30 |
| 2010/0187828 A1 * | 7/2010 | Reidy et al. | 290/55 |
| 2010/0219645 A1 * | 9/2010 | Yamamoto et al. | 290/55 |
| 2010/0295317 A1 * | 11/2010 | Mahawili | 290/55 |
| 2011/0064578 A1 * | 3/2011 | Bertolotti | 416/131 |
| 2011/0293357 A1 * | 12/2011 | Riisager et al. | 403/28 |

FOREIGN PATENT DOCUMENTS

| | | |
|---|---|---|
| JP | 57-99283 A | 6/1982 |
| JP | 58-180780 A | 10/1983 |
| JP | 58-211579 A | 12/1983 |
| JP | S58-193057 | 12/1983 |
| JP | 2002-106459 A | 4/2002 |
| JP | 2003-232274 A | 8/2003 |
| WO | WO 2010105692 A1 * | 9/2010 |

OTHER PUBLICATIONS

International Search Report for PCT/JP2012/061608 dated Aug. 14, 2012.

* cited by examiner

WIND TURBINE APPARATUS

TECHNICAL FIELD

The present invention relates to a wind power apparatus used for wind turbine apparatuses in general that employ a wind turbine as a motor, as well as for a power generating apparatus. The wind turbine of the wind power apparatus turns 360 degrees or more in a horizontal plane. The wind turbine autonomously turns downwind or toward a downstream side where weathercock stability can be gained, together with an inclined support column.

BACKGROUND ART

A conventional wind power generating apparatus is provided with a horizontal-axis wind turbine with vanes, such as of the propeller type or the Dutch type. In the wind power generating apparatus, a yaw control apparatus is used to cause the wind turbine to point directly into the wind according to the wind direction that may vary from moment to moment. The yaw control apparatus can only turn the wind turbine within a certain range. The yaw control apparatus cannot cause the wind turbine to point directly into the wind, which may blow from any direction in 360 degrees.

Further, to prevent electric cables and the like installed within the apparatus from being twisted as the wind turbine turns, the range of turning of the wind turbine is limited to within a certain range. In order to untwist the electric cables and the like, the wind turbine may have to turn in the opposite direction.

On the other hand, there is a wind turbine apparatus equipped with a vertical-axis wind turbine, such as the Darrieus type and the Savonius type. The wind turbine apparatus of these types has the advantage that the wind turbine can be rotated by receiving wind from any direction in 360 degrees without having to turn the wind turbine.

In the vertical-axis wind turbine, a blade that rotates in the same direction as the direction of movement of wind can receive the wind and rotate in the same direction as the direction of movement of the wind. However, a blade on the opposite side would rotate in a direction opposite to the direction of movement of the wind. Thus, the rotating force of the wind turbine is weakened.

In order to overcome this problem, a baffle plate is fitted in many cases. The baffle plate can gather wind such that the wind hits the blade on the side that rotates in the same direction as the direction of movement of wind but does not hit the blade on the side that would rotate against the direction of movement of wind.

However, the baffle plate itself may be fixed and unable to move. In this case, the baffle plate does not work at all, depending on the wind direction. As a result, the aforementioned problem cannot be overcome.

In an invention disclosed in Patent Document 1, for example, a vertical-axis wind turbine is fitted with a weathercock blade that moves around a wind-receiving rotor according to the wind direction. According to this invention, the baffle plate and the weathercock blade are operatively linked so that the baffle plate can be rotationally displaced to a correct position at all times according to the wind direction. Thus, even under a condition such that the wind direction is frequently changed, the baffle plate can be automatically rotated to track the change in wind direction. Accordingly, the rotating force of the rotor can be effectively increased. As the baffle plate is moved according to the wind direction, the aforementioned problem can be overcome.

CITATION LIST

Patent Literature

Patent Document 1: JP-A-2003-042055

SUMMARY OF INVENTION

Problem to be Solved by the Invention

However, in the wind power generating apparatus provided with the horizontal-axis wind turbine, the wind turbine cannot turn to point directly into the wind that may blow from any direction in 360 degrees, without moving backward.

In the wind power generating apparatus provided with the vertical-axis wind turbine, the wind turbine does not need to turn like the horizontal-axis wind turbine. However, in the wind power generating apparatus of the vertical axis type, the weathercock blade that rotates around the wind-receiving rotor according to the wind direction needs to be installed, and the weathercock blade and the baffle plate need to be operatively linked, so that the baffle plate can be automatically rotated according to the change in wind direction even under the condition of frequently changing wind direction, as in the invention according to Patent Document 1.

The present invention was made in view of the above problem. An object of the present invention is to provide a wind turbine apparatus that may be used for wind turbine apparatuses in general that employ a wind turbine as a motor, as well as for a power generating apparatus. The wind turbine apparatus can turn the wind turbine 360 degrees or more regardless of whether the wind turbine is of the horizontal axis type or the vertical axis type, and cause the wind turbine to be autonomously turned downwind or toward the downstream side where weathercock stability can be obtained, together with a tilted support column.

Solutions to the Problems

The present invention can solve the problem by the following means.

A wind turbine apparatus according to the present invention includes a wind turbine, a support column supporting the wind turbine, and a turning base as a base for the support column, wherein: the turning base includes a turning gear and two turning base shafts, the turning gear includes a first turning gear and a second turning gear, the first turning gear includes a vertical shaft, two disc-shaped gears (an upper-end side gear and a lower-end side gear) formed on upper and lower ends of the vertical shaft, and a through-hole at a shaft center of the gears and the vertical shaft, the second turning gear includes a vertical shaft penetrating the through-hole of the first turning gear, and two disc-shaped gears (an upper-end side gear and a lower-end side gear) formed on upper and lower ends of the vertical shaft, and the two turning base shafts (a first turning base shaft and a second turning base shaft) each includes a gear meshed with the turning gear and linked on the same shaft center by a differential apparatus, wherein: a first rotating shaft for transmitting rotating motion from the wind turbine is meshed with the upper-end side gear of the first turning gear, and the lower-end side gear of the first turning gear is meshed with the gear on the first turning base shaft, so that a rotating motion from the wind turbine is transmitted to the first turning base shaft by a rotation of the first turning gear, causing the first turning base shaft to rotate, a second rotating shaft for transmitting a rotating motion from the wind turbine is meshed with the upper-end side gear of the second turning gear, and the lower-end side gear of the second turning gear is meshed with the gear on the second turning base shaft, so that a rotating motion from the wind turbine can be transmitted to the second turning base shaft by a rotation of the second turning gear, causing the second turning base shaft to rotate, and the turning gear is configured to turn about a rotating axis of the turning gear 360 degrees or more on meshing parts between the upper-end side gear of the first turning gear and the upper-end side gear of the second turning gear and the first rotating shaft and the second rotating shaft, or meshing parts between the lower-end side gear of the first turning gear and the lower-end side gear of the second turning gear and the gear on the first turning base shaft and the second turning base shaft as points of contact, so that only the wind turbine, or the support column and the wind turbine can turn 360 degrees or more about the rotating axis of the turning gear.

The wind turbine apparatus according to the present invention includes the wind turbine, the support column supporting the wind turbine, and the turning base as the base for the support column. According to the present invention, the wind turbine can turn 360 degrees or more by rotating the turning gear provided in the turning base. Thus, the wind turbine can be made to point directly into the wind at all times according to the wind direction.

The turning of 360 degrees or more can be realized with the turning gear and the rotating shaft described below.

The turning gear includes the first turning gear and the second turning gear. The first turning gear includes a vertical shaft, and two disc-shaped gears (an upper-end side gear and a lower-end side gear) formed at the upper and lower ends of the vertical shaft. A through-hole is provided at the shaft center of the two disc-shaped gears and the vertical shaft.

The second turning gear includes a vertical shaft penetrating the through-hole of the first turning gear, and two disc-shaped gears (an upper-end side gear and a lower-end side gear) formed at the upper and lower ends of the vertical shaft. The two rotating shafts extending from the wind turbine are meshed with the respective upper-end side gears of the first turning gear and the second turning gear.

The two rotating shafts extending from the wind turbine are meshed with the upper-end side gear of the first turning gear and the upper-end side gear of the second turning gear, respectively. Thus, a mechanism such that a rotating motion of the wind turbine is transmitted to the first turning gear and the second turning gear to thereby rotate the first turning gear and the second turning gear is formed. The wind turbine turns with respect to the meshing parts between the upper-end side gear of the first turning gear and the upper-end side gear of the second turning gear and the two rotating shafts extending from the wind turbine.

Namely, the two rotating shafts extending from the wind turbine rotate about the edges of the upper-end side gears meshed with the upper-end side gear of the first turning gear and with the upper-end side gear of the second turning gear. In this way, the wind turbine turns.

The turning of 360 degrees or more may also be realized with the turning gear and the turning base shaft described below.

The turning base shaft includes the first turning base shaft and the second turning base shaft. The first turning base shaft and the second turning base shaft are linked on the same shaft center by the differential apparatus. On the first turning base shaft and the second turning base shaft, gears are fitted. The gears are meshed with the lower-end side gear of the first turning gear and the lower-end side gear of the second turning gear, respectively.

The lower-end side gear of the first turning gear and the lower-end side gear of the second turning gear are meshed with the gears fitted on the first turning base shaft and the second turning base shaft, respectively. Thus, a mechanism such that the first turning base shaft and the second turning base shaft are rotated as the lower-end side gear of the first turning gear and the lower-end side gear of the second turning gear are rotated by receiving the rotating motion of the wind turbine is formed. The wind turbine turns with respect to the meshing parts between the lower-end side gear of the first turning gear and the lower-end side gear of the second turning gear and the gears fitted on the first turning base shaft and the second turning base shaft.

Namely, the lower-end side gear of the first turning gear and the lower-end side gear of the second turning gear are rotated about the axis of the turning gear while meshed with the respective gears fitted on the first turning base shaft and the second turning base shaft. Thus, the wind turbine turns.

According to the present invention, the wind turbine is configured to turn on the two meshing parts. The wind turbine that has turned does not need to be rotated backward to return to the position before the turning. The wind turbine can turn in circles as many times as desired in the same turning direction.

For example, when the wind turbine apparatus according to the present invention is used for a wind power generating apparatus, an electric generator installed on the ground is connected via a shaft linked to the differential apparatus of the turning base. Thus, twisting of electric cables and the like by the turning of the wind turbine does not occur.

The turning gear may not be disposed within the turning base. The turning gear may be disposed within the support column as long as the turning gear can be meshed with the gears on the turning base shafts. For example, the turning gear may have a longitudinally extended shape.

The upper-end side gear of the first turning gear and the upper-end side gear of the second turning gear may include a spur gear or a bevel gear. When the upper-end side gear of the first turning gear and the upper-end side gear of the second turning gear are spur gears, spur gears are also used on the two rotating shafts extending from the wind turbine. When the upper-end side gear of the first turning gear and the upper-end side gear of the second turning gear are bevel gears, bevel gears are also used on the two rotating shafts extending from the wind turbine.

For the lower-end side gear of the first turning gear and the lower-end side gear of the second turning gear, bevel gears are used.

Bevel gears are also used for the gears fitted on the first turning base shaft and the second turning base shaft meshed with the lower-end side gear of the first turning gear and the lower-end side gear of the second turning gear.

By the above configuration, the wind turbine apparatus can turn 360 degrees or more.

The rotating motion of the wind turbine is transmitted via the two rotating shafts extending from the wind turbine to the first turning base shaft and the second turning base shaft. The rotations of the turning base shafts are transmitted via the differential apparatus to a shaft. Apparatuses utilize the rotational energy obtained from the shaft, thus using the wind turbine apparatus as a motor.

For example, when the wind turbine apparatus is used as a power generating apparatus, the shaft is connected to an electric generator, and electricity is generated by using the rotating motion obtained from the shaft.

The differential apparatus is an apparatus for suppressing the rotation of one turning base shaft when a difference is caused in the numbers of revolutions of the first turning base shaft and the second turning base shaft, so as to obtain a certain number of revolutions from both of the turning base shafts. As the differential apparatus, a differential gear, a differential lock, or a limited-slip differential is used, for example.

Instead of the configuration using the first and the second turning base shafts and the differential apparatus, a configuration using an oil pump may be utilized. For example, such a configuration includes a first pump chamber and a second pump chamber each filled with oil, with a pump A and a pump B extending from the respective pump chambers meshed with the respective lower-end side gears of the first turning gear and the second turning gear. In response to the rotation of the lower-end side gears, the pumps A and B are rotated, and the rotating motion is transmitted to the shaft after a certain number of revolutions is achieved in the first and the second pump chambers.

By adopting such configuration, the rotating motion of the wind turbine can be transmitted to the shaft without using the differential apparatus.

The wind turbine may be of the horizontal axis type or the vertical axis type.

The horizontal-axis wind turbine includes the propeller type, the Dutch type, the multi-blade type, and the sail-wing type, for example. The vertical-axis wind turbine includes the paddle type, the Savonius type, the gyro-mill type, the crossflow type, and the Darrieus type, for example. These are all useable. Other types of wind turbine may also be used. Different types of wind turbine may be used as long as the rotating shaft of the wind turbine can be meshed with the turning gear.

With regard to the rotating shaft, it is not required that there be a single rotating shaft between the wind turbine and the turning gear. A plurality of rotating shafts may be connected by using a universal joint and the like, or a belt or a chain may be interposed.

In particular, when the horizontal-axis wind turbine can turn, the following merits can be obtained.

Some of the conventional horizontal-axis wind turbines are provided with yaw control for pointing directly into the wind the direction of which may vary from moment to moment. However, such wind turbines cannot turn 360 degrees or more because doing so would twist the electric cables and the like running within the apparatus, nor can they continue turning indefinitely in the same turning direction. Namely, the turning range is limited, and when the wind turbine has turned, it has to rotate backward to untwist the electric cables.

According to the present invention, the wind turbine can turn 360 degrees or more in the same turning direction continuously. Thus, the wind turbine can be pointed to an appropriate orientation quickly as the wind direction varies from moment to moment, whereby rotating force can be obtained efficiently.

In the case of the vertical-axis wind turbine, the turning can provide the following merits.

The vertical-axis wind turbines are fundamentally omnidirectional such that the wind turbine can rotate no matter which direction in 360 degrees wind may blow. A blade on the same rotating side as the direction of movement of wind can rotate in the direction of movement of wind by receiving the wind. On the other hand, the blade on the other side would rotate in the opposite direction to the direction of movement of wind. Thus, the rotating force of the wind turbine is weakened by the blade on the other side.

In order to overcome this problem, the baffle plate is often provided. The baffle plate is configured to collect wind so that the wind hits the blade on the same rotating direction as the direction of movement of wind while preventing the wind from hitting the blade rotating in the direction opposite to the direction of movement of wind.

However, the baffle plate cannot eliminate the problem when the baffle plate itself is fixed. After all, in order to use the vertical-axis wind turbine in a truly omnidirectional manner, the baffle plate itself needs to be configured to turn 360 degrees.

According to the present invention, there is no need to turn the baffle plate itself 360 degrees. According to the present invention, the wind turbine with a fixed baffle plate can turn 360 degrees or more continuously in the same turning direction. Further, the baffle plate can be positioned in an appropriate orientation quickly so that the blades can be rotated efficiently as the wind direction varies from moment to moment.

Two rotating shafts extending from the wind turbine are used, both when the wind turbine is of the horizontal axis type and the vertical axis type.

For example, when a single horizontal-axis wind turbine is used, two bevel gears may be arranged in opposite directions on the horizontal axis shaft connected to the wind turbine. In this case, the bevel gears may be meshed with the respective two rotating shafts. Alternatively, two bevel gears may be combined on the horizontal axis shaft connected to the wind turbine with the longer-circumference faces of the gears disposed adjacent to each other. In this case, the sloping portions of the gears may be meshed with the respective two rotating shafts.

The two rotating shafts are meshed with the upper-end side gear of the first turning gear and the upper-end side gear of the second turning gear individually.

Two wind turbines may be used.

In this case, one rotating shaft extends from each wind turbine, so that the two rotating shafts are meshed with the upper-end side gear of the first turning gear and the upper-end side gear of the second turning gear individually.

When two wind turbines are used, the wind turbines may be of the horizontal axis type or the vertical axis type. One each of the horizontal axis type and the vertical axis type may be used as long as the numbers of revolutions of the wind turbines can be aligned.

In the wind turbine apparatus according to the present invention, the support column is vertically mounted on the turning base and configured to be tiltable with respect to the turning base shaft; and the wind turbine is configured to be autonomously turned downwind to gain weathercock stability when the support column is tilted out of a vertical axis of the turning base.

In the wind turbine apparatus according to the present invention, the support column, together with the wind turbine, is tilted with respect to the turning base shaft in the turning base.

The wind turbine mounted on the tilted support column can autonomously turn downwind to gain weathercock stability by receiving the wind pressure. The wind turbine is positioned downwind of the support column. The wind turbine rotates by receiving wind while positioned on the downwind side, rather than pointing directly into the wind. When the wind is low, the support column is positioned in the upright state to receive the wind. When the wind is strong, the support column is placed in the tilted state to allow the pressure of wind on the wind turbine to escape.

In the case of the horizontal-axis propeller type wind turbine, when the wind is strong, the vanes are gathered and contracted toward the shaft center of the horizontal axis so as to decrease the wind pressure on the wind turbine. When the wind is low, the vanes are expanded to increase the wind pressure on the wind turbine.

For adjusting the angle of tilting of the support column, a cylinder damper and the like may be used. The tilting angle of the support column may be adjusted electrically.

For example, when an air cylinder is used, the tilting angle of the support column is adjusted by supplying or discharging air to or from the cylinder according to the number of revolutions of the wind turbine. Specifically, a gear linked to a mechanism for adjusting the supply and discharge of air in the cylinder according to the number of revolutions of the wind turbine is connected to a gear at an appropriate position in the wind turbine apparatus. In this way, the supply and discharge of air in the cylinder can be adjusted as the gear in the wind turbine apparatus is rotated.

In this case, the gear in the wind turbine apparatus connected to the gear linked to the mechanism for adjusting the supply and discharge of air in the cylinder according to the number of revolutions of the wind turbine may be a rotating shaft, a turning gear, a gear on the turning base shaft, or a differential gear.

In the wind turbine apparatus according to the present invention, the support column includes a turning support column vertically mounted on the turning base, and a movable support column vertically mounted on the turning support column and configured to be tiltable with respect to a connecting shaft with the turning support column; and the wind turbine is configured to be autonomously turned downwind to gain weathercock stability when the movable support column is tilted out of a vertical axis of the turning support column.

In the wind turbine apparatus according to the present invention, the support column includes the turning support column and the movable support column. The movable support column, together with the wind turbine, is tilted with respect to the connecting shaft between the turning support column and the movable support column.

The wind turbine mounted on the tilted movable support column can autonomously turn downwind to gain weathercock stability by receiving the wind pressure. The wind turbine is positioned downwind of the movable support column. The wind turbine rotates by receiving the wind while positioned on the downwind side, rather than pointing directly into the wind. When the wind is low, the movable support column is placed in the upright state to receive the wind. When the wind is strong, the movable support column is placed in the tilted state to allow the pressure of the wind on the wind turbine to escape.

In the case of the horizontal-axis propeller type wind turbine, when the wind is strong, the vanes are gathered and contracted toward the shaft center of the horizontal axis so as to decrease the wind pressure on the wind turbine. When the wind is low, the vanes are expanded to increase the wind pressure on the wind turbine.

The rotating shafts extending from the wind turbine may be extended to the turning gear via a universal joint and the like. Thus, the bending of the rotating shafts can be prevented when the movable support column is tilted.

For adjusting the angle of tilting of the movable support column, a cylinder damper and the like may be used. The tilting angle of the support column may be adjusted electrically.

For example, when an air cylinder is used, the tilting angle of the movable support column is adjusted by supplying or discharging air to or from the cylinder according to the number of revolutions of the wind turbine. Specifically, a gear connected to a mechanism for adjusting the supply and discharge of air in the cylinder according to the number of revolutions of the wind turbine is connected to a gear at an appropriate position in the wind turbine apparatus. In this way, the supply and discharge of air in the cylinder can be adjusted as the gear in the wind turbine apparatus is rotated.

In this case, the gear in the wind turbine apparatus connected to the gear linked to the mechanism for adjusting the supply and discharge of air in the cylinder according to the number of revolutions of the wind turbine may be a rotating shaft, a turning gear, a gear on the turning base shaft, or a differential gear.

In the wind turbine apparatus according to the present invention, the support column includes a turning support column vertically mounted on the turning base and configured to be tiltable with respect to the turning base shaft, and a movable support column vertically mounted on the turning support column and configured to be tiltable with respect to a connecting shaft with the turning support column; and the wind turbine is autonomously turned downwind to gain weathercock stability when only the turning support column is tilted out of a vertical axis of the turning base, or when the turning support column is tilted out of the vertical axis of the turning base and further the movable support column is tilted out of an extension of the turning support column.

In the wind turbine apparatus according to the present invention, the support column includes the turning support column and the movable support column. The turning support column and the movable support column, together with the wind turbine, are tilted with respect to the turning base shaft or with respect to the connecting shaft between the turning support column and the movable support column.

The turning support column and the movable support column may be tilted in the same state as a single support column with respect to the turning base shaft. Alternatively, the turning support column and the movable support column may be individually tilted with respect to two pivots, i.e., the pivot of the turning base shaft and the pivot of the connecting shaft between the turning support column and the movable support column. The wind turbine mounted on the tilted movable support column can autonomously turn downwind to gain weathercock stability by receiving the wind pressure. The wind turbine is positioned downwind of the movable support column. The wind turbine rotates by receiving the wind while positioned on the downwind side, rather than pointing directly into the wind. When the wind is low, the movable support column is placed in the upright state to receive the wind. When the wind is strong, the movable support column is placed in the tilted state to allow the pressure of the wind on the wind turbine to escape.

In the case of the horizontal-axis propeller type wind turbine, when the wind is strong, the vanes are gathered and contracted toward the shaft center of the horizontal axis so as to decrease the wind pressure on the wind turbine. When the wind is low, the vanes are expanded to increase the wind pressure on the wind turbine.

The rotating shafts extending from the wind turbine may be extended to the turning gear via a universal joint and the like.

Thus, the bending of the rotating shafts can be prevented when the movable support column is tilted.

For adjusting the angle of tilting of the turning support column and the movable support column, a cylinder damper and the like may be used. The tilting angle of the turning support column and the movable support column may be adjusted electrically.

For example, when an air cylinder is used, the tilting angle of the turning support column and the movable support column is adjusted by supplying or discharging air to or from the cylinder according to the number of revolutions of the wind turbine. Specifically, a gear linked to a mechanism for adjusting the supply and discharge of air in the cylinder according to the number of revolutions of the wind turbine is connected to a gear at an appropriate position in the wind turbine apparatus. In this way, the supply and discharge of air in the cylinder can be adjusted as the gear in the wind turbine apparatus is rotated.

In this case, the gear in the wind turbine apparatus connected to the gear linked to the mechanism for adjusting the supply and discharge of air in the cylinder according to the number of revolutions of the wind turbine may be a rotating shaft, a turning gear, a gear on the turning base shaft, or a differential gear.

In the wind turbine apparatus according to the present invention, the first turning base shaft and the second turning base shaft are fitted with brake means; and a turning angle is adjusted by effecting one or the other of the brakes.

In the wind turbine apparatus according to the present invention, the first turning base shaft and the second turning base shaft are each fitted with brake means. As the brake means, disc brakes may be used. The brake means may be used for preventing the wind turbine from turning when the wind turbine is having a trouble or when the wind turbine needs to be tilted during strong wind. The brake means may also be used for adjusting the turning angle of the wind turbine so as to align the wind turbine with the wind direction.

For example, the turning angle is adjusted by the following method. By effecting the brake fitted to the first turning base shaft, the wind turbine turns in the direction of rotation of the gear on the second turning base shaft. By effecting the brake on the second turning base shaft, the wind turbine can turn in the direction of rotation of the gear on the first turning base shaft.

In the wind turbine apparatus according to the present invention, the support column or the movable support column is fitted with a wind control plate disposed on an upwind side of the wind turbine; the wind control plate is disposed on the upwind side of the wind turbine such that wind is collected toward the wind turbine with the support column or the movable support column placed in an upright state when the number of revolutions of the wind turbine is increased; and the wind control plate is disposed on the upwind side of the wind turbine such that the wind is blocked with the support column or the movable support column placed in a tilted state when the number of revolutions of the wind turbine is decreased.

In the wind turbine apparatus according to the present invention, the support column or the movable support column is fitted with the wind control plate. The wind control plate is positioned upwind of the wind turbine.

The wind control plate is positioned on the upwind side of the wind turbine when the support column or the movable support column is in the upright state. The wind control plate collects the flow of wind toward the wind turbine. The wind control plate is positioned on the upwind side of the wind turbine such that the wind turbine is hidden downwind of the wind control plate when the support column or the movable support column is in the tilted state. The wind control plate blocks the wind and prevents the wind from hitting the wind turbine.

The wind turbine apparatus according to the present invention, the wind turbine includes two wind turbines; the two wind turbines, when of the horizontal axis type, are disposed in parallel and adjacent to each other, with the axial directions of the horizontal axes oriented in the same direction, and with front surfaces of the wind turbines facing the same direction; and the two wind turbines, when of the vertical axis type, are disposed in parallel and adjacent to each other, with the axial directions of the vertical shafts oriented in the same direction; and the rotating shafts of the wind turbines are configured to rotate in mutually opposite directions.

The wind turbine apparatus according to the present invention includes two wind turbines.

The wind turbines may be of the horizontal axis type or the vertical axis type. When two horizontal-axis wind turbines are used, the wind turbines are disposed in parallel and adjacent to each other, with the axial directions of the horizontal axes of the wind turbines oriented in the same direction, and with the front faces of the wind turbines facing the same direction. When two vertical-axis wind turbines are used, the wind turbines are disposed in parallel and adjacent to each other, with the axial directions of the vertical shafts of the wind turbines oriented in the same direction.

When the wind direction or wind pressure of the wind received by the two wind turbines differs, a difference is caused in the rotating force obtained from the respective wind turbine, possibly resulting in a twist in the rotating motion transmitting pathway.

Thus, the two wind turbines are disposed close to each other and in the same orientation. In this way, the two wind turbines can receive the wind of the same wind direction and with the same wind pressure, whereby the same rotating force can be obtained from the respective wind turbines. The two wind turbines disposed in parallel rotate in mutually opposite directions. Thus, the rotational direction twist transmitted from the rotating shaft of each wind turbine can be cancelled out by the two opposite rotations. The rotating shafts extending from the wind turbines, as the first rotating shaft and the second rotating shaft, are meshed with the respective upper-end side gears of the first and the second turning gears.

Four or more wind turbines may be used provided that the number n of the wind turbines is an even number (2×n). When the wind turbines are of the same type in terms of the rate of rotation and rotational moment, higher generation efficiency can be obtained and breakage is less likely to occur. Thus, the wind turbines are preferably of the same type. However, different types of wind turbines, such as a horizontal axis type and a vertical axis type, may be used in combination.

The wind turbine apparatus according to the present invention may be configured such that two or more of the wind turbine apparatuses are used, with a shaft linked to the differential gear of each apparatus linked to a single electric generator.

The wind turbine apparatuses may be linked by disposing the shafts radially around the single electric generator. A plurality of the shafts may be linked into a single shaft linked to the electric generator. Thus, rotating motion can be obtained from the plurality of wind turbines, whereby the electric generator can be utilized as a power generating apparatus generating greater electric power.

In the wind turbine apparatus according to the present invention, the wind turbine mounted on the support column and the movable support column can be lowered close to the ground by tilting the support column or the turning support column to the horizontal position with respect to the turning base shafts. Thus, the wind turbine can be maintained near the ground. In this way, maintenance operation for the wind turbine can be facilitated, and the maintenance cost can be reduced. When the wind turbine apparatus is installed in the sea or on the bottom of a river, a similar effect can be obtained by tilting the wind turbine to an appropriate position on the ground.

Effects of Invention

The present invention provides the following effects.

1) Only the wind turbine, or the support column and the wind turbine can turn 360 degrees or more about the rotating shaft of the turning gear.

2) The wind turbine of both the horizontal axis type and the vertical axis type can be used.

3) The wind turbine, together with the tilted support column, can be autonomously turned downwind or to the downstream side where weathercock stability can be gained.

DESCRIPTION OF EMBODIMENTS

In the following, embodiments of the present invention will be described with reference to the drawings.

Figure 1:
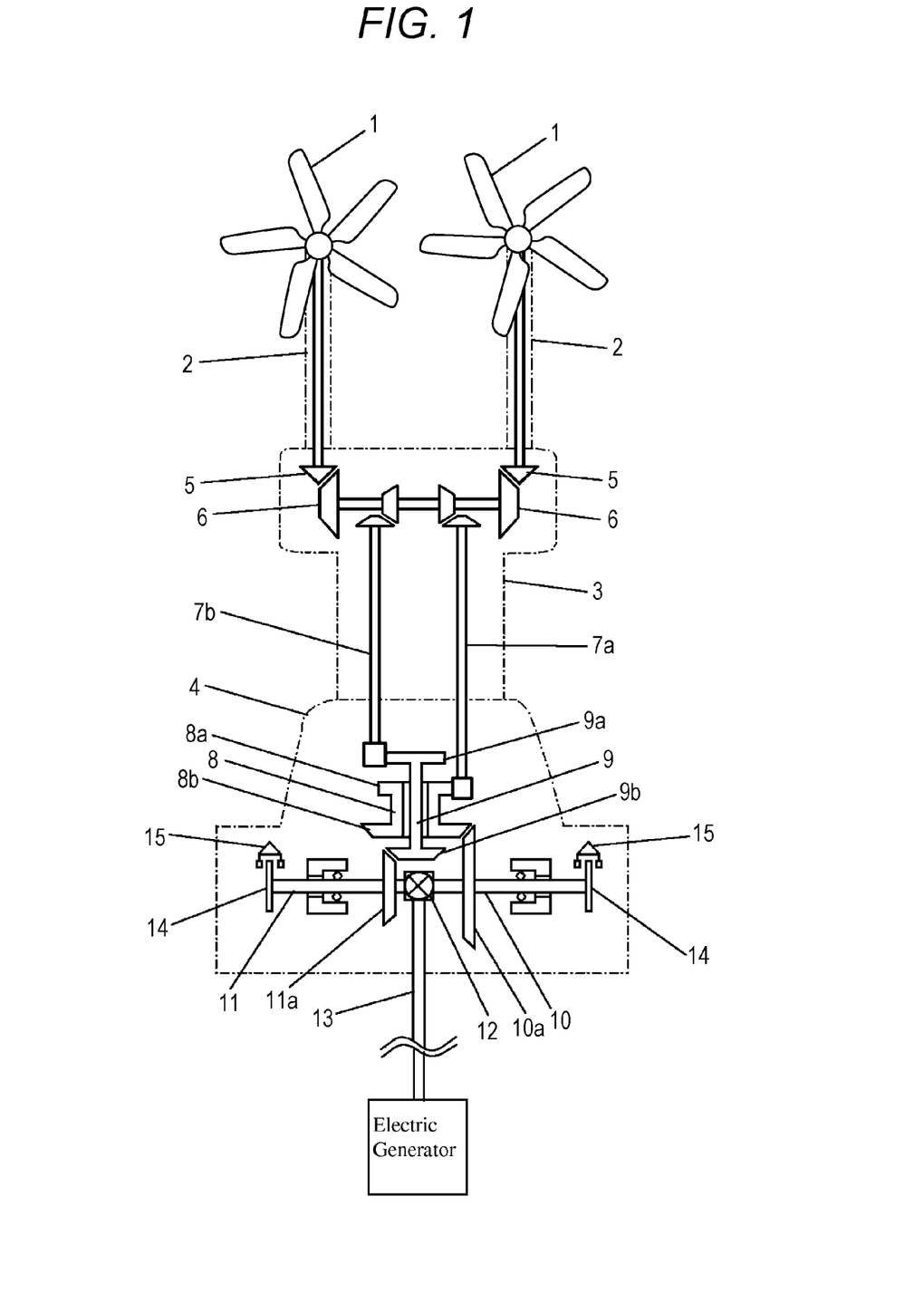
FIG. 1 is a schematic diagram illustrating a mechanism for turning a wind turbine apparatus.

FIG. 1 is a schematic diagram illustrating a mechanism for turning a wind turbine apparatus. The wind turbine apparatus includes wind turbines 1, movable support columns 2 supporting the wind turbines 1, a turning support column 3 linked to the movable support columns 2, and a turning base 4 installed on the ground to provide a base for the turning support column 3.

The wind turbines 1 employ two propeller type wind turbines.

The two wind turbines 1 are installed in parallel and adjacent to each other, with the axial directions of the propeller shafts oriented in the same direction and facing the frontal direction. The two wind turbines 1 installed in parallel are rotated in mutually opposite directions. Thus, rotational direction twist transmitted from the rotating shafts 5 of the wind turbines 1 can be cancelled out by the opposite two rotations.

The movable support columns 2 and the turning support column 3 are linked by a connecting shaft 6.

The movable support columns 2 and the turning support column 3 are linked by a connecting shaft 6.

In the movable support columns 2, the rotating shafts 5 extending from the wind turbines 1 are disposed. In the turning support column 3, rotating shafts 7a and 7b extending from the connecting shaft 6 are disposed. The rotating shafts 5 extending from the two wind turbines 1 are meshed with the connecting shaft 6. The rotating shafts extending from the connecting shaft 6 include a first rotating shaft 7a and a second rotating shaft 7b. The first rotating shaft 7a and the second rotating shaft 7b are meshed with an upper-end side gear 8a of a first turning gear 8 and an upper-end side gear 9a of a second turning gear 9, respectively.

In the turning base 4, turning gears and turning base shafts are installed. The turning gears include a first turning gear 8 and a second turning gear 9. The first turning gear 8 includes a vertical shaft and two disc-shaped gears (an upper-end side gear 8a and a lower-end side gear 8b) at the upper and lower ends of the vertical shaft. The vertical shaft with the two disc-shaped gears has a through-hole at the shaft center.

The second turning gear 9 includes a vertical shaft penetrating the through-hole of the first turning gear 8, and two disc-shaped gears (an upper-end side gear 9a and a lower-end side gear 9b) at the upper and lower ends of the vertical shaft. The first turning gear 8 and the second turning gear 9 are meshed with the first rotating shaft 7a and the second rotating shaft 7b, respectively, at the upper-end side gears 8a and 9a, respectively. Thus, a mechanism by which the rotating motion of the wind turbines 1 is transmitted to the first turning gear 8 and the second turning gear 9 to thereby rotate the first turning gear 8 and the second turning gear 9 is formed.

The first turning gear 8 and the second turning gear 9 are meshed with gears disposed on the axes of turning base shafts, at the lower-end side gears 8b and 9b, respectively The turning base shafts include a first turning base shaft 10 and a second turning base shaft 11. On the first turning base shaft 10 and the second turning base shaft 11, gears 10a and 11a are disposed, respectively. The gears 10a and 11a are meshed with the lower-end side gear 8b of the first turning gear 8 and the lower-end side gear 9b of the second turning gear 9, respectively.

Thus, a mechanism by which the rotation of the first turning gear 8 and the second turning gear 9 causes the first turning base shaft 10 and the second turning base shaft 11 to rotate is formed.

The first turning base shaft 10 and the second turning base shaft 11 are connected at the same shaft center by a differential gear 12.

The differential gear 12 is configured to suppress the rotation of one turning base shaft when a difference in the number of rotations is produced between the first turning base shaft 10 and the second turning base shaft 11, so that the shafts have a certain number of rotations. Instead of the differential gear 12, various differential apparatuses, such as a differential lock or a limited-slip differential, may be used.

In such a configuration, the rotational energy of the wind turbines 1 is transmitted to a shaft 13 via the rotating shafts 5 extending from the wind turbines 1 and the differential gear 12. Thus, the wind turbine apparatus can be utilized for various apparatuses as a motor.

For example, when the wind turbine apparatus is used as a power generating apparatus, the shaft 13 is connected to an electric generator so that the rotational energy of the wind turbines 1 can be transmitted to the electric generator via the shaft 13 for generating electric power.

The wind turbine apparatus is configured to turn the wind turbines 1 with respect to the meshing parts between the upper-end side gear 8a of the first turning gear 8 and the upper-end side gear 9a of the second turning gear 9 and the rotating shafts 7a and 7b.

Namely, the wind turbines 1 turn with respect to the meshing parts between the upper-end side gear 8a of the first turning gear 8 and the upper-end side gear 8a of the second turning gear 9 and the two rotating shafts 7a and 7b, as the rotating shafts 7a and 7b rotate around the edges of the upper-end side gears 8a and 9a meshed with the upper-end side gear 8a of the first turning gear 8 and the upper-end side gear 9a of the second turning gear 9.

The wind turbine apparatus is also configured to turn the wind turbines 1 with respect to the meshing parts between the lower-end side gear 8*b* of the first turning gear 8 and the lower-end side gear 9*b* of the second turning gear 9 and the gears 10*a* and 11*a* on the turning base shafts.

Namely, the wind turbines 1 turn as the lower-end side gear 8*b* of the first turning gear 8 and the lower-end side gear 9*b* of the second turning gear 9 rotate about the axes of the turning gears 8 and 9 while meshed with the gear 10*a* disposed on the first turning base shaft 10 and with the gear 11*a* disposed on the second turning base shaft 11.

The wind turbines 1, fixed to the movable support columns 2, turn together with the movable support columns 2 and the turning support column 3.

In the wind turbine apparatus according to the present invention, the turning base 4 and the electric generator are linked on the ground. In the support columns, no electric cables and the like are installed. Thus, twisting of electric cables and the like does not occur when the wind turbines 1 are turned.

Accordingly, the wind turbines 1, when turned, do not need to rotate backward to return to the position before turning, and therefore the wind turbines 1 can turn in circles as many times as desired in the same direction.

At the ends of the first turning base shaft 10 and the second turning base shaft 11, disc brakes are installed.

The disc brakes include disc-shaped brake rotors 14 forming the ends of the first turning base shaft 10 and the second turning base shaft 11, and brake calipers 15 sandwiching the brake rotors 14.

The brake calipers 15 include brake pads configured to be pressed onto the brake rotors 14 so as to effect braking by frictional force. The disc brakes may be used to prevent the wind turbines 1 from turning when the wind turbines 1 are in trouble, or when the wind turbines 1 need to be tilted due to strong winds. The disc brakes may also be used for adjusting the turning angle of the wind turbines 1 to align the wind turbines 1 with the wind direction.

Figure 2:
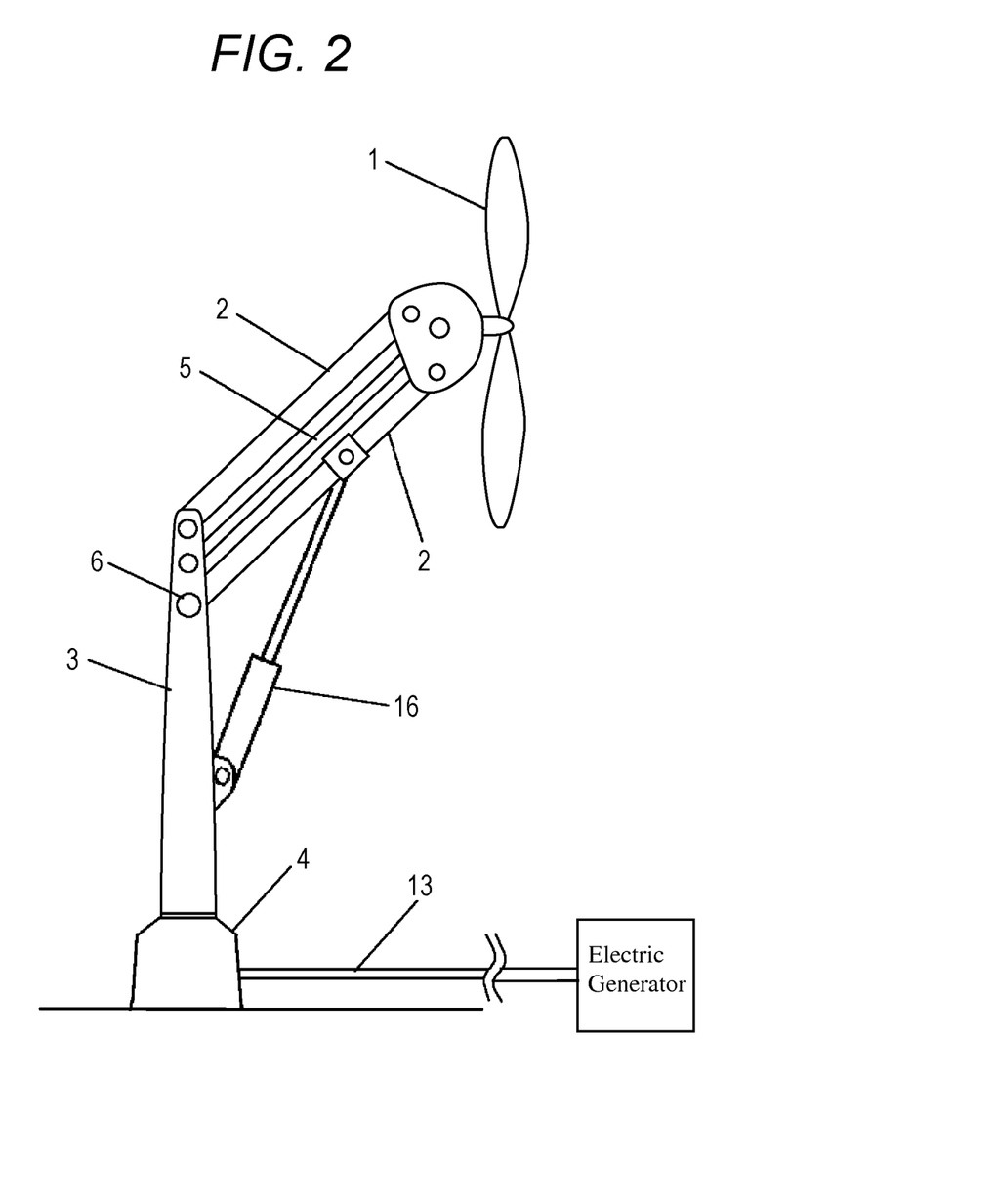
FIG. 2 is a schematic side view of the wind turbine apparatus in a state of gaining weathercock stability and turning a wind turbine downwind.

FIG. 2 is a schematic side view of the wind turbine apparatus when the wind turbines are turned downwind by gaining weathercock stability.

The movable support columns 2 and the turning support column 3 are vertically mounted on the turning base 4 installed on the ground.

The movable support columns 2 are tilted toward the downwind side (right side of FIG. 2) with respect to the connecting shaft 6 with the turning support column 3. The wind turbines 1 are tilted together with the movable support columns 2. In the example illustrated in FIG. 2, the wind turbines 1 are of the horizontal-axis propeller type. Thus, the two movable support columns 2 are configured to be tilted while the wind turbines 1 are maintained in a horizontal state.

A cylinder damper 16 is connected between one of the two movable support columns 2 and the turning support column 3.

The wind turbines 1 are positioned downwind (right side of FIG. 2) of the movable support columns 2 and rotated by wind blowing from the upwind side (left side of FIG. 2).

When the movable support columns 2 are in a tilted state, the wind turbines 1 are autonomously turned downwind to gain weathercock stability by the wind pressure. The wind turbines 1 are autonomously turned downwind to be aligned with the wind direction. Thereafter, the wind turbines 1 can keep turning 360 degrees or more to follow the wind direction that may vary from moment to moment.

The movable support columns 2 are in an upright state when the wind is low so that the wind turbines 1 can receive the wind. When the wind is strong, the movable support columns 2 are placed in a tilted state to allow the pressure of the wind hitting the wind turbines 1 to escape.

When the wind power is low and the rotation of the wind turbines 1 is stopped, the movable support columns 2 may be tilted to the horizontal position to pull down the wind turbines 1. In this way, the wind turbine apparatus can be prevented from being damaged by the strong wind pressure of a gust of wind, for example. The tilting angle of the movable support columns 2 is adjusted by using the cylinder damper 16.

The adjustment of the tilting angle of the movable support columns 2 by the cylinder damper 16 is performed by supplying or discharging air to or from the cylinder damper 16 according to the number of revolutions of the wind turbines.

Specifically, a gear linked to a mechanism for adjusting, in the cylinder damper 16, the supply and discharge of air in the cylinder damper 16 according to the number of revolutions of the wind turbines is connected to a gear at an appropriate position within the wind turbine apparatus. As the gear is rotated according to the number of revolutions of the wind turbines, the adjustment of the supply and discharge of air in the cylinder damper 16 can be performed.

The movable support columns 2 may be provided with a wind control plate on the upwind side of the wind turbines 1.

In order to increase the number of revolutions of the wind turbines 1, the wind control plate is disposed on the upwind side of the wind turbines 1 with the movable support columns 2 placed in the upright state, so that the wind can be collected toward the wind turbines 1. Conversely, in order to decrease the number of revolutions of the wind turbines 1, the wind control plate is disposed on the upwind side of the wind turbines 1 with the movable support columns 2 placed in the tilted state, so that the wind can be blocked.

In the case of the horizontal-axis propeller type wind turbine, when the wind is strong, the vanes may be pulled and gathered toward the shaft center of the horizontal axis, whereby the wind pressure on the wind turbines can be decreased. When the wind is strong, the vanes may be expanded to increase the wind pressure on the wind turbines.

The rotating shafts 5 extending from the wind turbines 1 or the rotating shafts 7*a* and 7*b* extending from the connecting shaft 6 to the turning gears may be divided into a plurality of rotating shafts connected by a universal joint.

In this way, the movable support columns 2 and the turning support column 3 can be freely designed without being restricted by the location of the rotating shafts.

The shaft 13 extends from the turning base 4. Thus, the wind turbine apparatus can be configured as a motor, and the rotational energy from the wind turbines 1 can be utilized for various apparatuses.

For example, the shaft 13 is connected to an electric generator so that the wind turbine apparatus is used as a power generating apparatus. In another possible configuration, two or more wind turbine apparatuses may be used, and the shaft 13 extending from each of the wind turbine apparatuses may be linked to a single electric generator.

In this way, rotating motion can be obtained from a plurality of wind turbine apparatuses, whereby greater electric power can be generated.

The wind turbine apparatus according to the present embodiment may be used for wind turbine apparatuses in general as well as the wind power generating apparatus, such as a marine power generating apparatus for tidal power generation or wave power generation, or a hydro-power generating apparatus for pumped storage generation, for example.

For example, in a tidal power generating apparatus, the wind turbine apparatus sunk under the sea turns while being tilted according to the tidal current. By transmitting the rotating motion of the wind turbine as it is rotated by the tide to an electric generator installed on the ground via a shaft, electricity can be generated. In a pumped storage power generating apparatus, the wind turbine apparatus sunk on the bottom of a river turns while being tilted according to the flow of the river. By transmitting the rotating motion of the wind turbine as it is rotated by the water flow to an electric generator installed on the ground via a shaft, electricity can be generated.

When the wind turbine apparatus is used in any of the above power generating apparatuses, the wind turbines may be of any type, such as the propeller type, the Dutch type, the multi-blade type, the sail-wing type, the paddle type, the Savonius type, the gyro-mill type, the cross-flow type, or the Darrieus type. Thus, an optimum wind turbine with high efficiency can be selected.

The wind turbine apparatus may be used for wind turbine apparatuses in general that use a wind turbine as a motor, and thus utilized for various applications, as well as for a power generating apparatus.

DESCRIPTION OF REFERENCE SIGNS

1 Wind turbine
2 Movable support column
3 Turning support column
4 Turning base
5 Rotating shaft
6 Connecting shaft
7 Rotating shaft
7a First rotating shaft
7b Second rotating shaft
8 First turning gear
8a Upper-end side gear of first turning gear
8b Lower-end side gear of first turning gear
9 Second turning gear
9a Upper-end side gear of second turning gear
9b Lower-end side gear of second turning gear
10 First turning base shaft
10a Gear on first turning base shaft
11 Second turning base shaft
11a Gear on second turning base shaft
12 Differential gear
13 Shaft
14 Brake rotor
15 Brake caliper
16 Cylinder damper

The invention claimed is
1. A wind turbine apparatus comprising:
a wind turbine;
a support column supporting the wind turbine;
a turning base as a base for the support column; and
an electric generator that generates electricity by receiving rotating motion of the wind turbine via a shaft connected to a differential apparatus, wherein
the turning base includes a turning gear and two turning base shafts,
the turning gear includes a first turning gear and a second turning gear,
the first turning gear includes a vertical shaft, two disc-shaped gears comprising an upper-end side gear formed on an upper end of the vertical shaft and a lower-end side gear formed on a lower end of the vertical shaft, and a through-hole at a shaft center of the gears and the vertical shaft,
the second turning gear includes a vertical shaft penetrating the through-hole of the first turning gear, and two disc-shaped gears comprising an upper-end side gear formed on an upper end of the vertical shaft and a lower-end side gear formed on a lower end of the vertical shaft, and
the two turning base shafts comprise a first turning base shaft and a second turning base shaft, each including a gear meshed with the turning gear and linked on the same shaft center by a differential apparatus, wherein:
a first rotating shaft for transmitting rotating motion from the wind turbine is meshed with the upper-end side gear of the first turning gear, and the lower-end side gear of the first turning gear is meshed with the gear on the first turning base shaft, so that a rotating motion from the wind turbine is transmitted to the first turning base shaft by a rotation of the first turning gear, causing the first turning base shaft to rotate,
a second rotating shaft for transmitting a rotating motion from the wind turbine is meshed with the upper-end side gear of the second turning gear, and the lower-end side gear of the second turning gear is meshed with the gear on the second turning base shaft, so that a rotating motion from the wind turbine can be transmitted to the second turning base shaft by a rotation of the second turning gear, causing the second turning base shaft to rotate, and
the turning gear is configured to turn about a rotating axis of the turning gear 360 degrees or more on meshing parts between the upper-end side gear of the first turning gear and the upper-end side gear of the second turning gear and the first rotating shaft and the second rotating shaft, or meshing parts between the lower-end side gear of the first turning gear and the lower-end side gear of the second turning gear and the gear on the first turning base shaft and the second turning base shaft as points of contact, so that only the wind turbine, or the support column and the wind turbine can turn 360 degrees or more about the rotating axis of the turning gear.

2. The wind turbine apparatus according to claim 1, wherein:
the support column is vertically mounted on the turning base and configured to be tiltable with respect to the first turning base shaft or the second turning base shaft; and
the wind turbine is configured to be autonomously turned downwind to gain weathercock stability when the support column is tilted out of a vertical axis of the turning base.

3. The wind turbine apparatus according to claim 1, wherein:
the support column includes
a turning support column vertically mounted on the turning base, and
a movable support column vertically mounted on the turning support column and configured to be tiltable with respect to a connecting shaft with the turning support column; and
the wind turbine is configured to be autonomously turned downwind to gain weathercock stability when the movable support column is tilted out of a vertical axis of the turning support column.

4. The wind turbine apparatus according to claim 1, wherein:
the support column includes
a turning support column vertically mounted on the turning base and configured to be tiltable with respect to the first turning base shaft or the second turning base shaft, and a movable support column vertically mounted on the turning support column and configured to be tiltable with respect to a connecting shaft with the turning support column; and the wind turbine is autonomously turned downwind to gain weathercock stability when only the turning support column is tilted out of a vertical axis of the turning base, or when the turning support column is tilted out of the vertical axis of the turning base and further the movable support column is tilted out of an extension of the turning support column.

5. The wind turbine apparatus according to claim 1, wherein:
the first turning base shaft and the second turning base shaft are fitted with brake means; and
a turning angle is adjusted by effecting one or the other of the brakes.

6. The wind turbine apparatus according to claim 2, wherein:
the first turning base shaft and the second turning base shaft are fitted with brake means; and
a turning angle is adjusted by effecting one or the other of the brakes.

7. The wind turbine apparatus according to claim 3, wherein:
the first turning base shaft and the second turning base shaft are fitted with brake means; and
a turning angle is adjusted by effecting one or the other of the brakes.

8. The wind turbine apparatus according to claim 4, wherein:
the first turning base shaft and the second turning base shaft are fitted with brake means; and
a turning angle is adjusted by effecting one or the other of the brakes.

9. The wind turbine apparatus according to claim 2, wherein:
the support column or the movable support column is fitted with a wind control plate disposed on an upwind side of the wind turbine;
the wind control plate is disposed on the upwind side of the wind turbine such that wind is collected toward the wind turbine with the support column or the movable support column placed in an upright state when the number of revolutions of the wind turbine is increased; and
the wind control plate is disposed on the upwind side of the wind turbine such that the wind is blocked with the support column or the movable support column placed in a tilted state when the number of revolutions of the wind turbine is decreased.

10. The wind turbine apparatus according to claim 3, wherein:
the support column or the movable support column is fitted with a wind control plate disposed on an upwind side of the wind turbine;
the wind control plate is disposed on the upwind side of the wind turbine such that wind is collected toward the wind turbine with the support column or the movable support column placed in an upright state when the number of revolutions of the wind turbine is increased; and
the wind control plate is disposed on the upwind side of the wind turbine such that the wind is blocked with the support column or the movable support column placed in a tilted state when the number of revolutions of the wind turbine is decreased.

11. The wind turbine apparatus according to claim 4, wherein:
the support column or the movable support column is fitted with a wind control plate disposed on an upwind side of the wind turbine;
the wind control plate is disposed on the upwind side of the wind turbine such that wind is collected toward the wind turbine with the support column or the movable support column placed in an upright state when the number of revolutions of the wind turbine is increased; and
the wind control plate is disposed on the upwind side of the wind turbine such that the wind is blocked with the support column or the movable support column placed in a tilted state when the number of revolutions of the wind turbine is decreased.

12. The wind turbine apparatus according to claim 5, wherein:
the support column or the movable support column is fitted with a wind control plate disposed on an upwind side of the wind turbine;
the wind control plate is disposed on the upwind side of the wind turbine such that wind is collected toward the wind turbine with the support column or the movable support column placed in an upright state when the number of revolutions of the wind turbine is increased; and
the wind control plate is disposed on the upwind side of the wind turbine such that the wind is blocked with the support column or the movable support column placed in a tilted state when the number of revolutions of the wind turbine is decreased.

13. The wind turbine apparatus according to claim 6, wherein:
the support column or the movable support column is fitted with a wind control plate disposed on an upwind side of the wind turbine;
the wind control plate is disposed on the upwind side of the wind turbine such that wind is collected toward the wind turbine with the support column or the movable support column placed in an upright state when the number of revolutions of the wind turbine is increased; and
the wind control plate is disposed on the upwind side of the wind turbine such that the wind is blocked with the support column or the movable support column placed in a tilted state when the number of revolutions of the wind turbine is decreased.

14. The wind turbine apparatus according to claim 7, wherein:
the support column or the movable support column is fitted with a wind control plate disposed on an upwind side of the wind turbine;
the wind control plate is disposed on the upwind side of the wind turbine such that wind is collected toward the wind turbine with the support column or the movable support column placed in an upright state when the number of revolutions of the wind turbine is increased; and
the wind control plate is disposed on the upwind side of the wind turbine such that the wind is blocked with the support column or the movable support column placed in a tilted state when the number of revolutions of the wind turbine is decreased.

15. The wind turbine apparatus according to claim 8, wherein:
the support column or the movable support column is fitted with a wind control plate disposed on an upwind side of the wind turbine;
the wind control plate is disposed on the upwind side of the wind turbine such that wind is collected toward the wind turbine with the support column or the movable support column placed in an upright state when the number of revolutions of the wind turbine is increased; and the wind control plate is disposed on the upwind side of the wind turbine such that the wind is blocked with the support column or the movable support column placed in a tilted state when the number of revolutions of the wind turbine is decreased.

16. The wind turbine apparatus according to claim 1, wherein:

the wind turbine includes two wind turbines;

the two wind turbines, when of the horizontal axis type, are disposed in parallel and adjacent to each other, with the axial directions of the horizontal axes oriented in the same direction, and with front surfaces of the wind turbines facing the same direction; and the two wind turbines, when of the vertical axis type, are disposed in parallel and adjacent to each other, with the axial directions of the vertical shafts oriented in the same direction; and the rotating shafts of the wind turbines are configured to rotate in mutually opposite directions.

* * * * *